May 16, 1967
J. D. LEWIS
3,319,466
TEMPERATURE DROP DETECTION MEANS
Filed Oct. 12, 1964
2 Sheets-Sheet 1
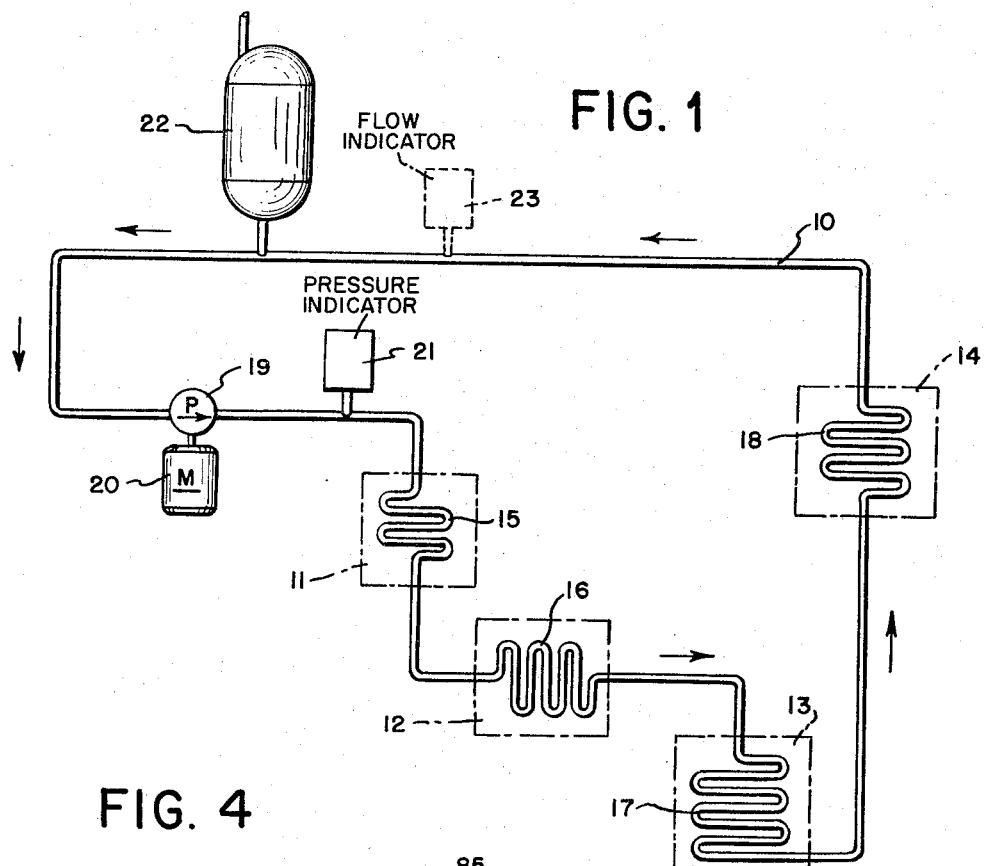
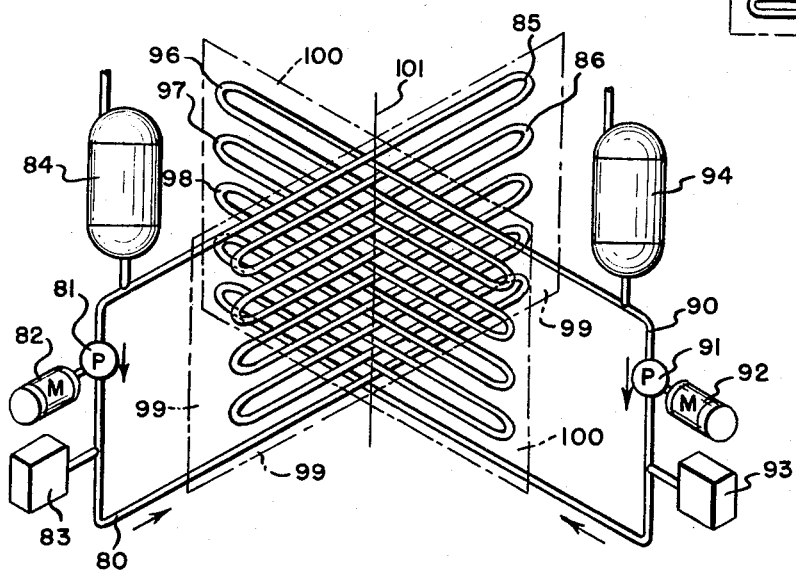
INVENTOR
John D. Lewis
BY
*Pennie, Edmonds, Morton, Taylor & Adams*
ATTORNEYS

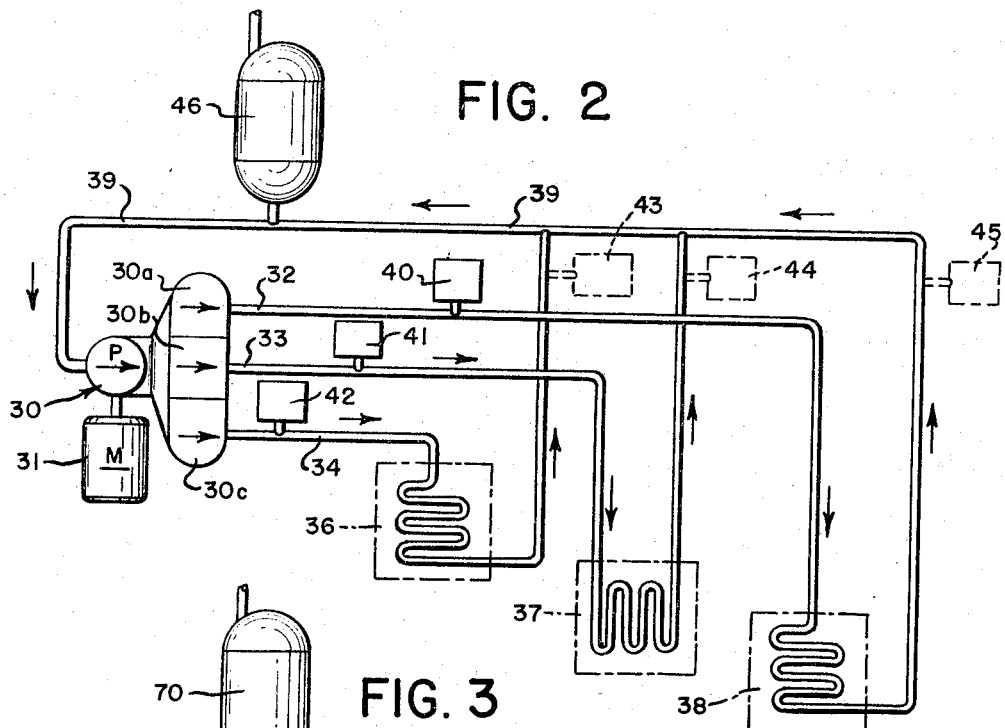
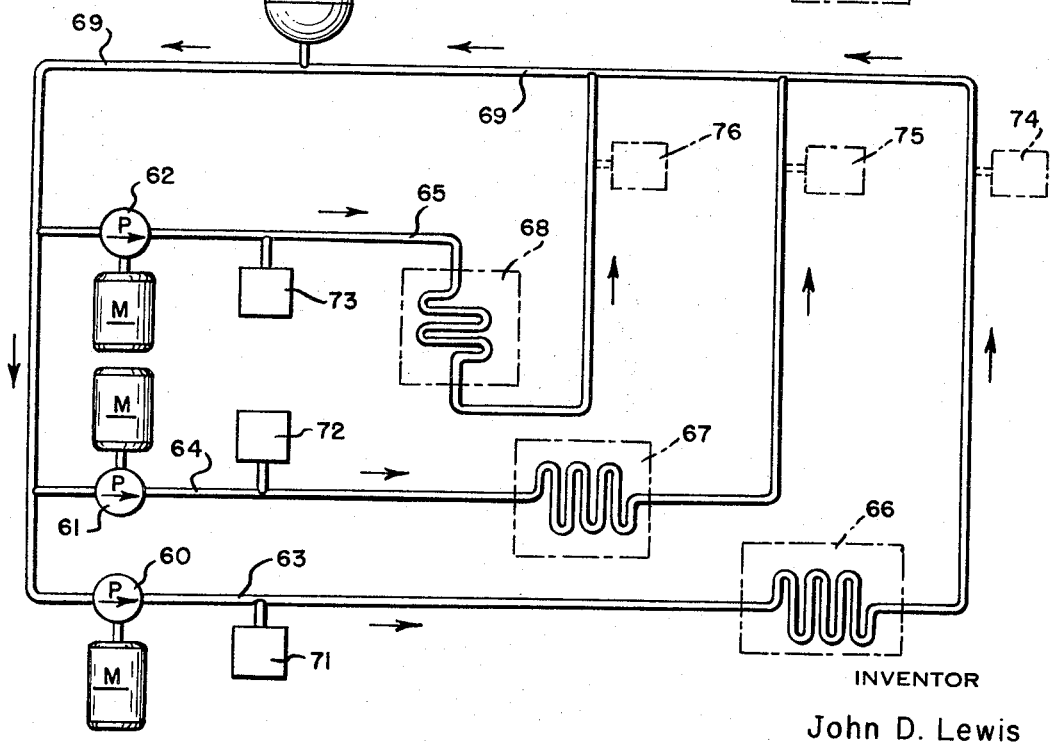
INVENTOR
John D. Lewis

United States Patent Office 3,319,466
Patented May 16, 1967

3,319,466
TEMPERATURE DROP DETECTION MEANS
John D. Lewis, Berkeley Heights, N.J., assignor to Vehoc Corporation, a corporation of Delaware
Filed Oct. 12, 1964, Ser. No. 403,113
17 Claims. (Cl. 73—357)

This invention relates to the detection of a temperature drop below a predetermined level, and more particularly relates to detection means which depends for its operation upon the freezing of a circulating liquid to indicate the occurrence of a certain temperature drop.

In particular areas of commercial importance, it is necessary to monitor temperature changes by non-electrical means. This is especially true when transporting or storing flammable materials such as petroleum products and natural gas. Frequently, visual temperature readings are also precluded by the size or design of the particular facility. Thus, in one important area within which the invention described herein will find its immediate application, namely in the transportation of natural gas and light hydrocarbon fuels, the product is stored at low temperatures and elevated pressures in bottles fabricated of a special low-temperature alloy. These bottles are built into the hold of a ship or other structure of suitable design, the structural elements of which are made of standard materials which usually do not have satisfactory strength at low temperatures. Should a leak occur in one or several of the bottles containing the natural gas, the expanding vapor will lower the temperature in the surrounding area, including that of the structural elements within the ship's hold in the vicinity of the bottles. This could, of course, result in a weakening and even a collapse of a part of the ship's structure.

In the preceding particular example, and also in analogous situations, it will be necessary therefore to detect a drop in temperature below a level deemed to be the minimum safe operating temperature for the materials comprising the structures in the vicinity of the bottles or similar containers.

In attempting to use prior art temperature detection devices, certain major problems are encountered. Thus, with electrical temperature measuring devices such as thermocouples, there is an obvious risk of fire or explosion, particularly in the presence of natural gas. Thermocouples or like electro-mechanical devices are also excluded as a practical matter because large numbers of rather closely spaced devices of this kind would be required to monitor to a given area properly. Visual temperature monitoring means would also be impossible or inconvenient to use. Moreover, most temperature detection instruments of the kind described above are subject to "drift" with the passage of time. This instability is undesirable wherever it is important to have accurate monitoring of temperatures many months or even years after installation.

This invention provides an apparatus which will meet the requirement for detecting a temperature drop below a particular critical level, apparatus which is at once simple and technically sound, obviating the difficulties of devices heretofore available. Fundamentally, the apparatus herein is based upon the concept of continuously circulating a liquid through the area to be monitored, the liquid so circulated having a freezing point about equal to the critically reduced temperature below which it is deemed undesirable for temperatures in the area to fall. If the temperature in the area falls below that reduced temperature, the liquid will freeze and interfere with further circulation. This event is recognized by the apparatus of the invention and suitable corrective measures may then be taken.

Broadly stated, the apparatus provided by the invention for the detection of a temperature drop below a certain temperature comprises a tube extending through at least one area within which a temperature drop is to be detected. A liquid in the tube has a freezing point approximately equal to this certain temperature. Means are included for circulating the liquid through the tube and for detecting an obstruction to the flow of liquid in the tube caused by the freezing in the liquid. These detecting means may be pressure-responsive means communicating with the tube downstream from the circulating means and upstream from the area within which a temperature drop is to be detected, or it may be flow-responsive means communicating with the tube downstream from both the circulating means and the area within which a temperature drop is to be detected. The invention further contemplates a method for detecting a reduction in temperature in a certain area to a reduced temperature comprising the steps of circulating a liquid having a freezing point approximately equal to the reduced temperature through a tube extending through this area, and sensing an obstruction to the flow of the liquid when the temperature in the area reaches the reduced temperature.

In the following description of the invention reference may be made to the accompanying drawings in which:

FIG. 1 is a schematic illustration of a general form of the apparatus of the invention;

FIGS. 2 and 3 are similar illustrations of certain variations of the apparatus; and FIG. 4 is a schematic illustration of a particular modification of the detection apparatus.

Referring to FIG. 1, the apparatus there depicted comprises a long continuous tube 10 having a small internal diameter optimally of from about 0.5 to 5 millimeters. This tube may be fabricated of any suitable heat-conductive metal such as copper, aluminum or the like. The tube 10 in its circuit passes through areas 11 to 14 within which a prospective temperature drop below a nominal level is to be detected. To provide for good contact between the walls of the tube 10 and the atmosphere of the environment in those areas, the tube in the respective areas may be formed into loops 15 to 18, each preferably of several turns. The precise configuration of each loop will, of course, vary with the particular arrangement of structures within the area monitored. No set pattern is required, merely one which will permit substantially rapid detection of a temperature drop.

A pump 19 driven by motor 20 is connected to the tube 10 upstream from the areas 11 to 14, thus providing an integral and closed continuous circuit as shown in FIG. 1. The pump so connected is a standard positive displacement type pump, suitable for passing a liquid slowly and continuously through the tube 10 of narrow diameter. On the downstream side of the pump 19 a device 21 is connected into tube 10, the purpose of which is to detect the presence of any obstruction in tube 10. In particular, the device 21 is preferably a pressure gauge. When the pressure rises in the tube 10 as a result of the formation of a downstream obstruction, the device 21 registers this rise and trips an alarm or otherwise indicates the event.

The tube 10 is filled with a liquid selected principally for its freezing point temperature, which must be approximately equal to the predetermined reduced temperature to be monitored. Of course, the liquid must be chemically stable over long periods of time and must not react with the metal out of which the tube 10 is fabricated. By a proper choice of this liquid, a wide variety of predetermined temperatures may be monitored. Water may be used and its freezing point of 0° C. will set a rather high alarm temperature for prospective uses. Other liquids (among the many which are suitable) include carbon tetrachloride (freezing at −22.6° C.), aniline (freezing point: −6.2° C.) and triethylene glycol (freezing point: −5° C.).

The circuit (including both the pump and tube) of the apparatus must be maintatined in a filled state without pockets of air. For this purpose, a surge tank 22 is connected into the tube 10. Any changes in the volume of the liquid or the dimensions of the apparatus will be compensated for by the reservoir of liquid within the tank 22.

The liquid is circulated slowly and continuously through the tube 10 by the pump 19. The rate at which the liquid must circulate for proper functioning of the apparatus is a function of the cross-sectional area and wall thickness of the tube, the specific heat of the liquid and tube and several other variables. Pragmatically, the rate of circulation is determined by operational success, i.e., whether the liquid will freeze in the tube when the environmental temperature is at or just below the predetermined temperature. In its circuit, the liquid will pass through the loops 15 to 18 in the respective areas 11 to 14 of concern. If the temperature of an area falls below the critical temperature, the liquid will freeze, thereby obstructing the flow in the tube. The increased pressure between the pump 19 and the obstruction will be registered by the device (pressure gauge) 21 which will convey this fact to an observer.

In place of the pressure gauge 21, a flow indicator 23 may be connected into the tube 10 downstream from the last area 14. The formation of an obstruction in a given area as a result of a temperature drop below the predetermined temperature will result in a decrease in the flow of liquid in tube 10. This decrease can be detected by the flow-responsive indicator 23.

FIGS. 2 and 3 represent systems based upon the form of the apparatus shown in FIG. 1 and discussed above. They are designed to monitor individual areas independently so that each area has its own temperature monitoring circuit. In this way, the area within which the temperature has dropped below the predetermined level can be ascertained more precisely. In FIG. 2, a unit 30 comprising pumps 30a, 30b and 30c and driven by motor 31 is connected to tube circuits 32, 33 and 34. The circuits 32 to 34 traverse areas 36, 37 and 38 in which a temperature drop below a certain level must be noted. In those areas the tube may be looped as described earlier. After passing through the areas, the individual circuits are connected to a common return tube 39 which in turn is connected to the inlet of the pump 30. Pressure gauges 40, 41 and 42 are connected into each tube circuit beyond the manifold 35 on the downstream side of the pump. Alternatively, flow indicators 43, 44 and 45 may be connected into the individual circuits downstream of the respective monitored areas. A surge tank 46 is connected into the return tube 39.

The system illustrated in FIG. 2 functions in accordance with the same principle as the basic apparatus of FIG. 1. A suitable liquid is pumped through the individual circuits. A temperature drop below the predetermined level in any one or more of the areas 36 to 38 will cause the liquid to freeze, thereby activating one of several devices (upstream to pressure gauges 42 to 44 or, alternatively, downstream flow indicators 48 to 50) which will in turn notify an operator of an obstruction in a particular area.

The system of FIG. 3 also provides for more accurately pinpointing the location of a cold spot. This system comprises a plurality of pumps 60, 61, 62, each connected to tube circuits 63, 64, 65 traversing the areas 66, 67, 68 which are to be monitored. For convenience, the tubes may be connected to a common tube 69 during part of the circuit. A surge tank 70 is connected to the tube 69. Each individual tube circuit has either an upstream pressure gauge 71, 72, 73 or a downstream flow indicator 74, 75, 76 in appropriate locations (as described above). A suitable liquid is pumped slowly through the circuits by the pumps 60, 61, 62; a temperature drop below the predetermined level in one or more of the areas 66, 67, 68 will freeze the liquid in the tube in that area. This obstruction will be registered by the devices 71, 72, 73, or 74, 75, 76.

Areas 36, 37, and 38 of FIGURE 2, and areas 66, 67, and 68 of FIGURE 3 may actually be a plurality of such areas similar to those in FIGURE 1.

In the apparatus and system described thus far, it should be noted that mechanical difficulties could prevent proper functioning of the system. Difficulties with the pump operation could be detected by placing an additional pressure gauge in the tube circuit. This additional gauge would respond to a decrease in pressure below normal. Should the pump stop, this gauge would enable an operator to detect that difficulty and correct it quickly.

It may be desirable to determine with reasonable accuracy the location of a cold spot in a large space. This can be accomplished by using the apparatus shown in FIG. 4. Basically, a pair of the apparatus of FIG. 1 are utilized with the looped portions of the tube circuits thereof intermeshing as shown in the drawing. Thus, one circuit comprises a tube 80, a pump 81 driven by motor 82, a pressure gauge 83 downstream of pump 81, and a surge tank 84. Within the space the temperature level of which is to be monitored, the tube 80 may be looped preferably in the form of long, shallow loops 85, 86, etc., either as shown in FIG. 4 or in analogous fashion. The second circuit of the pair of apparatus comprises the same form of tube 90, pump 91, motor 92, pressure gauge 93 and surge tank 94. Within the monitored space, the tube 95 is also looped in a manner similar to that of tube 80 forming preferably elongated loops 96, 97, 98, etc. The tubes 80 and 90 and the respective loops thereof are arrayed so that these loops intermesh. Thus, for example, one course of loop 96 passes between the two courses of loop 85 (of tube 80). Correspondingly, one course (the lower in FIG. 4) of loop 85 passes between the two courses of loop 96. The intermeshing of loops may be extended as desired. There will, of course, be a variety of ways for interweaving the loops. As shown in FIG. 4, the loops of each tube 80 and 90 lie in the respective planes 99, 100 which may intersect at any suitable angle.

Each apparatus of the pair functions as described earlier. If the gauges of both apparatus, that is, both the gauge 83 and the gauge 93 show an increase in pressure, the cold spot is approximately in the vicinity of the area of intermeshing of tubes 80 and 90, shown in the drawing as line 101, the line defined by the intersection of the planes 99, 100. If, on the other hand, only one gauge reflects the formation of an obstruction in a tube, then the cold spot will be found at or near one of the extreme ends of the circuit so responding. The general idea in this embodiment of the invention is to have one portion of the tube monitor its own area and part of an area monitored by another portion of the tube. A localized determination of a temperature drop can therefore be made depending upon whether only the first-mentioned monitoring portion responds or whether both monitoring portions respond.

I claim:

1. Apparatus for the detection of a temperature drop below a certain temperature comprising a tube extending through at least one area within which a temperature drop is to be detected, a liquid in the tube having a freezing point approximately equal to said certain temperature, means for circulating the liquid through the tube, and means for detecting an obstruction to the flow of liquid in the tube caused by the freezing of the liquid.

2. Apparatus according to claim 1 wherein the means for detecting an obstruction to the flow of liquid in the tube comprises pressure-responsive means communicating with the tube downstream from the circulating means and upstream from the area within which a temperature drop is to be detected.

3. Apparatus according to claim 1 wherein the means for detecting an obstruction to the flow of liquid in the tube comprises flow-responsive means communicating with the tube downstream from both the circulating means and the area within which a temperature drop is to be detected.

4. Apparatus for the detection of a temperature drop below a certain temperature comprising a closed circuit tube having a plurality of portions extending in loops through respective areas within which a temperature drop is to be detected, a liquid in the tube having a freezing point approximately equal to said certain temperature, at least one pump communicating with said tube for continuously circulating the liquid through all portions of the tube, and means for detecting an obstruction to the flow of liquid in the tube caused by the freezing of the liquid.

5. Apparatus according to claim 4 wherein the means for detecting an obstruction to the flow of liquid in the tube comprises at least one pressure-responsive means communicating with the tube downstream from the pump and upstream from at least one of the areas within which a temperture drop is to be detected.

6. Apparatus according to claim 4 wherein the means for detecting an obstruction to the flow of liquid in the tube comprises at least one flow-responsive means communicating with the tube downstream from both the pump and at least one of the areas within which a temperature drop is to be detected.

7. Apparatus for the detection of a temperature drop below a certain temperature comprising a closed circuit tube having a plurality of interconnected portions extending through respective areas within which a temperature drop is to be detected, a liquid in the tube having a freezing point approximately equal to said certain temperature, at least one pump communicating with the tube for circulating the liquid through said portion of the tube, and a plurality of means for detecting obstructions to the flow of liquid in the respective portions of the tube caused by the freezing of the liquid.

8. Apparatus according to claim 7 wherein at least one of said portions of the tube extends through a plurality of said areas.

9. Apparatus according to claim 7 wherein at least some of said portions of the tube extend in loops through two of said areas.

10. Apparatus according to claim 7 wherein said portions of the tube are connected in parallel with one another.

11. Apparatus according to claim 10 wherein a single pump is included having multiple outlet means communicating with the upstream end of all the parallel portions of the tube.

12. Apparatus according to claim 10 wherein a plurality of pumps are included having outlet means communicating with the upstream ends of the respective parallel portions of the tube.

13. Apparatus according to claim 10 wherein the means for detecting an obstruction to the flow of liquid comprises a plurality of pressure-responsive means communicating with the respective upstream ends of the parallel portions of the tube.

14. Apparatus according to claim 10 wherein the means for detecting an obstruction to the flow of liquid comprises a plurality of flow-responsive means communicating with the respective downstream ends of the parallel portions of the tube.

15. A method of detecting a temperature drop in a certain area from a nominal to a reduced temperature which comprises circulating a liquid having a freezing point approximately equal to said reduced temperature through a tube extending through said area, and sensing an obstruction to the flow of said liquid in the tube caused by freezing of the liquid when the temperature in said area reaches said reduced temperature.

16. A method according to claim 15 wherein an obstruction to the flow of liquid in the tube is sensed by monitoring increases in the pressure of the liquid in the tube upstream from said area.

17. A method according to claim 15 wherein an obstruction to the flow of liquid in the tube is sensed by monitoring a decrease in the flow of liquid in the tube downstream from said area.

References Cited by the Examiner

UNITED STATES PATENTS

| 2,217,637 | 10/1940 | Junkins | 236—20 X |
| 2,674,101 | 4/1954 | Calling | 137—59 X |
| 3,007,461 | 11/1961 | Armbrust | 123—41.15 |

LOUIS R. PRINCE, *Primary Examiner.*

F. SHOON, *Assistant Examiner.*

Dedication 3,319,466.—*John D. Lewis*, Berkeley Heights, N.J. TEMPERATURE DROP DETECTION MEANS. Patent dated May 16, 1967. Dedication filed Sept. 16, 1971, by the assignee, *Vehoc Corporation*.

Hereby dedicates to the Public the entire remaining term of said patent.
[*Official Gazette December 28, 1971.*]